3,151,060
PROCESS AND APPARATUS FOR LIQUID-GAS
REACTIONS
Paul W. Garbo, Freeport, N.Y., assignor to Hydrocarbon Research, Inc., New York, N.Y., a corporation of New Jersey
Filed Nov. 22, 1961, Ser. No. 154,147
6 Claims. (Cl. 208—213)

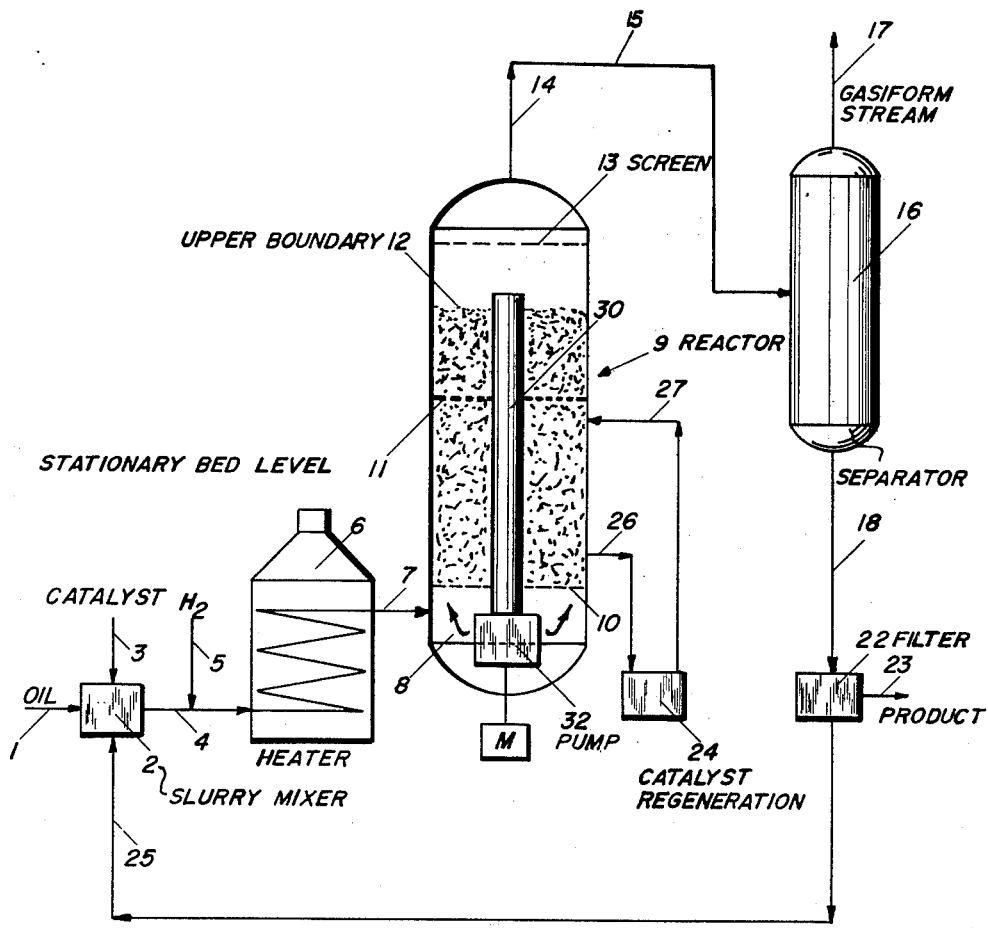

This invention relates to an improved method of chemically reacting a liquid and a gasiform material with the aid of a particulate catalyst. This application is a continuation-in-part of my application Serial No. 750,796, filed July 24, 1958, now abandoned.

Many different types of processes are in use and have been suggested for carrying out a chemical reaction between a liquid and a gasiform material in the presence of a catalyst. These processes involve combinations of various manipulative steps, e.g., upflow, downflow and horizontal flow of the liquid, concurrent and counter-current flow of the gasiform material relative to the flow of liquid and the use of the particulate catalyst in the form of a fixed bed or a suspension in the liquid. These prior processes have various problems or shortcomings connected with them. For example, they often suffer from poor contact between the liquid and gasiform reactants and between the reactants and the surfaces of the catalyst. Another limiting factor often involved in these processes when a fixed bed of catalyst is used is that the pressure drop of the reactants flowing across the bed of catalyst rises rapidly after a certain point as the throughput rate of these reactants is increased. Still another limiting factor, which may occur in connection with certain processes, e.g., hydrocarbon conversion processes, is that deposits tend to form on the inner walls of the reactor and also on the surfaces of the catalyst particles. This causes loss of activity of the catalyst and may even lead to plugging up of the reactor particularly where a fixed bed of catalyst is used.

A technique which has been used in chemically reacting a gasiform material and a liquid with the aid of a catalyst is to disperse relatively fine particles of the catalyst in the liquid to form a slurry which is then subjected to reaction conditions. However, although this technique inherently increases the amount of catalyst surface in contact with the liquid, it suffers from the fact that a film of product forms around and moves with the catalyst particles, an effect which obviously decreases the effectiveness of the catalyst. Moreover, in reacting the gasiform material with the liquid, relatively large bubbles of the gasiform material tend to form in the liquid within the reaction zone and large bubbles have the effect of decreasing the degree of contact between the liquid and the gasiform material, thereby impairing reaction. Although the use of screens, baffles or a fixed mass of packing material within the reactor tends to reduce the size and number of relatively large bubbles of the gasiform material, such expedients bring back the pressure drop disadvantage of a fixed catalyst bed.

It is an object of this invention to provide an improved process of chemically reacting liquid and gasiform materials in the presence of a particulate catalyst. A further object is to provide a process of and apparatus for chemically reacting liquid and gasiform materials in the presence of fine particles of catalyst present in the liquid in the form of a suspension or slurry whereby improved contact among the reactants and the catalyst and a decrease in the rate of formation of deposits in the reaction zone are achieved.

These and other objects and advantages are attained by concurrently flowing streams of the gasiform reactant and a slurry of fine particles of catalyst in the liquid reactant upwardly through a reaction zone containing a mass of solid particles of a contact material, the mass of solid particles being maintained in random motion within the reaction zone by the upflowing streams. A mass of solid particles in this state of random motion in a liquid medium may be described as "ebullated" as more specifically defined in the patent of Johanson 2,987,465. An ebullated mass of solid particles has a gross volume that is larger than that of the same mass when it is stationary. The benefits of this invention are obtained when this expansion is at least 10% of the volume of the stationary mass. The contact material is in the form of beads, pellets, lumps, chips or like particles usually having an average dimension of approximately at least $\frac{1}{32}$ inch, and more frequently in the range of $\frac{1}{16}$ to $\frac{1}{4}$ inch. The particles of the contact material are considerably heavier than the catalyst particles in the slurry or suspension and due to their weight remain in the reactor in a state of random motion while the relatively fine catalyst particles are carried in suspension out of the reactor by the liquid. The size and shape of the ebullated particles of contact material used in any specific process will depend on the particular conditions of that process, e.g., the density, viscosity and velocity of the liquid involved in that process.

It is a relatively simple matter to determine for any process the range of throughput rates of upflowing slurry which will cause the mass of relatively coarse particles of contact material to become expanded while the particles are maintained in random motion. The gross volume of this mass of contact material expands when ebullated without, however, any substantial quantity of the particles being carried away by the upflowing slurry and, therefore, a fairly well-defined upper level of randomly moving particles establishes itself in the upflowing slurry. This upper level above which few, if any, ebullated particles of contact material ascend will hereinafter be called the upper level of ebullation. In contrast to processes in which fluid streams flow downwardly or upwardly through a fixed mass of particles, the spaces between the particles of an ebullated mass are large with the result that the pressure drop of the liquid flowing through the ebullated mass is small and remains substantially constant as the fluid throughput rate is increased. Thus, a considerably smaller consumption of power is required for a given throughput rate.

The presence of ebullated solids in the reactor causes a higher degree of intimate contact between the liquid and gasiform reactants and between these reactants and the catalyst surfaces than if no ebullated solids were present. Moreover, the ebullated solids tend to remove any film of product building up on the catalyst surfaces as often occurs when a slurry-type catalyst is used in the conventional way. As the fine catalyst particles of the slurry travel through the ebullated mass of coarse particles, they collide with the ebullated particles and any waste deposits which have formed on the fine catalyst particles or the particles of the ebullated mass tend to be abraded away. This effect is additional to that caused by the collisions among the ebullated particles themselves and between the ebullated particles and the walls of the reactor. In short, the effectiveness of the catalyst is doubly ensured by the more intimate contact of the reactants with the catalyst and by the cleaner catalyst surfaces, both made possible by the ebullated coarse particles.

Gasiform and liquid materials are continuously withdrawn from the top portion of the reaction zone either as a mixed stream or as separate streams. In either case, fine catalyst particles are carried out of the reactor as a suspension in the withdrawn liquid. At least part of the slurry leaving the reactor is filtered, centrifuged or otherwise processed to remove catalyst particles therefrom.

The liquid free of fine particles is recovered as product, while the separated catalyst is returned to the reactor. This may be done by mixing the separated catalyst with the feed liquid before entering the reactor. However, it is often advisable to recycle part of the liquid withdrawn from the top of the reactor. In such case, the recycled liquid will ordinarily not be processed to remove the catalyst particles suspended therein at the time of withdrawal from the top of the reactor but rather the catalyst particles separated from the recovered liquid product may be added thereto for reintroduction into the reactor. Thus, catalyst particles removed from the liquid product may be suspended in the fresh feed liquid or in the recycle slurry stream or in a mixture of the two for reentry into the bottom of the reactor. Make-up catalyst, when needed, may similarly be introduced into the reaction zone by suspension in any liquid stream flowing thereinto.

The process of the invention may be carried out under a wide variety of conditions. To obtain the advantages of this invention it is only necessary that the catalyst slurry and gasiform material flow upwardly through a mass of particulate contact material at a rate causing such mass to reach an ebullated state. In each ebullated system, variables which may be adjusted to attain the desired ebullation include the flow rate, density and viscosity of the liquid and the gasiform material, and the size, shape and density of the contact material. However, it is a relatively simple matter to operate any particular process so as to cause the mass of contact material employed to become ebullated and to calculate the percent expansion of the ebullated mass after observing its upper level of ebullation through a glass window in the reaction vessel or by other means such as slurry samples drawn from the vessel at various levels and examined for the presence of particles of contact material.

In carrying out the process of this invention, the fine catalyst particles in the slurry entering the reactor must be light enough so that they will be carried through the ebullated mass of coarse particles and out of the reactor when the superficial linear velocity of the liquid is sufficient to ebullate the particles of contact material in the reactor to an extent such that the gross volume of the ebullated mass is at least 10% greater than that of the original settled mass. While the coarse particles making up the ebullated mass in the reactor must obviously be heavier than the catalyst particles in the slurry, the limits for each type of particle may not properly be defined by arbitrary numerical values. A practical limit to the smallness of the fine catalyst particles is the tolerable difficulty of economically separating such particles from the liquid product. The particles of contact material to be ebullated will, in most cases, not be larger than ½ inch, since above this size the superficial velocity of the slurry needed to ebullate the mass of contact material is generally higher than is economically feasible. In most processes carried out in accordance with this invention, the size of the catalyst particles will not be larger than 12 mesh, the contact particles will be approximately of a size passing through ¼ inch mesh openings but retained by $\frac{1}{32}$ inch mesh openings (i.e., between about 3 and 20 mesh screens of the Tyler scale), the gross density of the stationary mass of contact material between about 25 and 200 pounds per cubic foot, the flow rate of the slurry between about 20 and 120 gallons per minute per square foot of horizontal cross-section of the ebullated mass, and the expanded volume of the ebullated mass not more than about double the volume of the settled mass. In certain cases, slurry flow rates as low as 5 and as high as 500 gallons per minute per square foot of horizontal cross-section of the ebullated mass may be used. Similarly, the expanded volume of the ebullated mass may be several times the volume of the settled mass but expanding the settled mass by ebullation to a volume more than three times its original volume is rarely justified on technical or economic grounds. The concentration of catalyst in the slurry may vary within wide limits depending on the nature of the reaction. In most cases, however, the catalyst concentration will be between 0.1 and 40% based on the weight of the liquid.

Generally, the process conditions of temperature, pressure and ratio of liquid to gasiform material in any particular system operated in accordance with this invention may be similar to the conditions used in operating the system without the use of an ebullated mass of contact material. However, when the ebullating technique of this invention is used, a greater degree of contact is obtained and, therefore, the time to bring about the desired chemical reaction in any particular system will be shortened.

The particles of contact material making up the ebullated solids may be composed of any of various types of material which may be substantially inert or serve to perform a desired function in addition to the improvement of contact among the reactants and the catalyst. Substantially inert materials which may be used are glass, quartz, metallurgical slag, fireclay or any material which will stand up under the conditions in the reactor and will not adversely effect the reaction or product. If it is desired to keep the formation of waste deposits on the catalyst particles and the walls of the reactor to a minimum, the ebullated solids are preferably composed of any of various hard materials commonly used for abrasive purposes, e.g., silicon carbide (Carborundum) or refractory alumina (Alundum or Corundum). In other reactions, it may be desirable for the ebullated solids to possess catalytic activity or other property aiding in the carrying out of a chemical reaction. For example, in the hydrodesulfurization of heavy oils, it is believed that some cracking of the oil is desirable both to render the soluble metallo-organic impurities insoluble and thus prevent them from inactivating the hydrogenation catalyst, and to facilitate the destructive hydrogenation of the more refractory sulfur-containing compounds such as the thiophenes which apparently must be cracked to make the sulfur more amenable to reaction with hydrogen to form hydrogen sulfide. Thus, in the hydrodesulfurization of a heavy oil with a slurry-type hydrogenation catalyst, the ebullated solids may advantageously be a material which has extended surfaces due to a porous structure, e.g., clay, silica gel or any of the many known cracking catalysts. In other processes wherein the reaction involved is contact limited, it may be advantageous for the ebullated solids to be composed of the same catalyst as that making up the slurry. For example, in the partial hydrogenation of fats and oils, it may be advantageous to employ both a slurry-type nickel catalyst and large pellets of nickel catalyst as the ebullated solids. The ebullated solids also may perform functions other than the catalyzation of reactions, e.g., the removal of desirable or undesirable components from the stream of reactants and products passing through the reactor. Thus, in some processes it may be beneficial to remove undesirable ions in the liquid passing through the reaction vessel. In such situations, pellets or beads of an ion exchange resin may be used as the ebullated solids. In other cases, the liquid may contain a component that is preferably isolated; a suitable adsorbent or molecular sieve such as one of the zeolites may advantageously be employed as the ebullated solids. When the ebullated solids are employed to remove either desirable or undesirable components from the reactants and/or products flowing through the reactor, it is necessary either continuously or periodically to regenerate the particles making up the ebullated solids so that they may continue to perform the desired function. The ebullated solids may be circulated by removing them from a point near the bottom of the reactor, treating them to displace the component which has accumulated thereon, and injecting them back into the reactor at a point above that of withdrawal. Fresh feed liquid or recycle liquid may be used to slurry and return the regenerated solids to the ebullated mass in the reaction zone.

The process of this invention may be applied to any process of chemically reacting a liquid and a gasiform material wherein a slurry-type catalyst is employed. Specific processes in which the technique of this invention may be used are the hydrodesulfurization and hydrocracking of hydrocarbon oils with a hydrogenation catalyst, the partial hydrogenation of fats and oils with a Raney nickel catalyst, the hydrogenation of high molecular weight aldehydes and ketones in the production of alcohols using a zinc, copper or cadmium chromite catalyst, the dry ammonolysis of chlorobenzene to produce aniline using gaseous ammonia and a slurry of cuprous oxide in chlorobenzene, the chlorination of benzene to produce chlorobenzene using a ferric chloride catalyst, the oxidation with air of naphthalene to phthalic anhydride or anthracene to anthraquinone with a vanadium oxide catalyst, and the esterification process involving the contacting of ethanol vapors with a slurry of molten maleic anhydride and fine zirconium oxide catalyst particles.

The invention will now be further illustrated with reference to the accompanying drawing which diagrammatically shows a reactor and process for reacting hydrogen with a heavy hydrocarbon oil.

Charge stock from line 1 is mixed in slurry mixer 2 with fresh, finely divided hydrogenation catalyst supplied by line 3 and with recycled catalyst from line 25. Slurry mixer 2 may be any of various well known types of equipment, e.g., paddle, propeller or turbine mixers. The resulting slurry on passing through line 4 is combined with hydrogen-containing gas from line 5, all of the fluid reactants and suspended catalyst flowing through heater 6. The preheated gas-slurry mixture is thence transferred by line 7 to bottom 8 of reactor 9 which contains a mass of coarse solid particles of contact material supported on screen or perforated plate 10. When the process is not in operation, the contact material has a stationary bed level 11. When, however, the process according to this invention is being carried out, the particles of contact material are in constant random motion with respect to each other and the mass expands so that its upper boundary or upper level of ebullation is at 12. It is desirable to recycle slurry from the top portion of the reactor 9 by pumping it back to the bottom of the reactor in order to hold the temperature in reactor 9 at a desired value for an exothermic or endothermic operation, respectively. This may be accomplished internally within reactor 9 through a standpipe 30 with a top open end above upper level of ebullation 12 which standpipe extends to a pump 32 disposed below screen 10 in reactor bottom 8. The slurry discharged by the submerged pump then flows upwardly again through the mass of ebullated solids. Although the rate of entry of the gas-slurry mixture is not sufficient to carry the particles of contact material out of reactor 9, the fine particles of hydrogenation catalyst in the entering slurry continue to be carried along by the liquid in gross unidirectional flow through the ebullated mass of contact material during which time they collide frequently with the ebullated particles. These collisions have the effect of wearing away tarry deposits and poisons which form on the surfaces of both types of particles. Reactor 9 may contain a second screen or perforated plate 13 near its top to prevent stray particles of contact material from leaving reactor 9 with the reaction effluent. It should be noted that screen 13 is near reactor outlet 14, well above upper level of ebullation 12.

The reaction effluent discharging through outlet 14 and containing particles of hydrogenation catalyst which are fine enough to pass through the openings of screen 13 flows through line 15 into separator 16 wherein it is separated into gasiform and slurry phases. A gasiform stream which comprises unreacted hydrogen and both gaseous and vaporized hydrocarbons is drawn off by line 17 and conventionally treated to recover hydrogen, hydrocarbon gases, gasoline, etc. The separated hydrogen may, of course, be used as part of the hydrogen fed to the system. The slurry from separator 16 is transferred by line 18 to filter 22 wherein the fine catalyst particles are separated out. The liquid product free of fine solids is drawn off by line 23 and may be further treated to obtain desired ultimate consumer products, e.g., by distillation, catalytic cracking, lubricating oil refining, etc. The separated fine solids are conveyed from filter 22 by line 25 to mixer 2. This recycling of catalyst may be carried out with any of various conventional solids conveying means. If desired, the separated fine catalyst may be treated, e.g., by burning off waste deposits, treatment with hydrogen, etc., before being recycled.

The foregoing description is for a process which operates batchwise as far as the ebullated solids are concerned. When a process is relatively clean, i.e., little or no foreign deposits are formed on the contact particles, the process may be operated in this fashion for a considerable period without interruption. However, when a process causes substantial fouling deposits to be formed on the ebullated solids, particularly those having catalytic activity, or the process involves adsorption of some component by the ebullated solids, it is necessary to replace periodically or continuously the fouled contact material in the reaction zone with fresh or regenerated material. To operate such a process in a completely continuous manner, ebullated solids may be continuously withdrawn from reactor 9 through line 26 as a slurry and sent to regeneration plant 24. Therein the particles of contact material are separated from the liquid and fine catalyst particles, regenerated, reslurried in the separated liquid and sent back to reactor 9 by way of line 27.

The advantages of the invention will now be illustrated by the following examples.

*Example 1*

A hydrogenation catalyst composed on a weight basis of 95% iron oxide and 5% chromium oxide is prepared by coprecipitation, drying and grinding so that all particles pass through an 80-mesh screen. This catalyst is mixed with a heavy residual oil composed substantially entirely of components boiling above 900° F. and having a gravity of 10° API, a sulfur content of 5.5% by weight and a Ramsbottom carbon residue of 15.5% by weight to form a slurry in which the hydrogenation catalyst is 20% by weight of the oil. In accordance with the general process illustrated in the drawing, the slurry is charged to the bottom of a hydrogenation reactor which contains a mass of decolorizing clay pellets of 4 to 8 mesh size and which is maintained at a temperature of 830° F. and a pressure of 3000 p.s.i.g. Hydrogen-rich gas in an amount of 1000 cubic feet (standard conditions) of hydrogen per barrel of charge stock is supplied to the bottom of the reactor with the slurry. This hydrogen combined with recycle hydrogen separated from the gasiform portion of the reaction effluent results in a total of 6000 cubic feet of hydrogen entering the reactor for each barrel of charge stock. The reaction effluent is separated into gasiform and slurry phases and the gasiform phase is further treated to obtain recycle hydrogen and valuable hydrocarbon of low molecular weight. Most of the slurry, in an amount of about 30 volumes per volume of freshly prepared slurry, is recycled in the reactor, resulting in a total slurry flow rate through the reactor of 60 gallons per minute per square foot of reactor horizontal cross-section; this flow causes ebullation or random motion of the clay pellets with no clay pellets leaving the reactor, and an expansion of the settled volume of clay pellets of about 30 to 35%. That part of the slurry leaving the reactor which is not recycled is filtered to obtain liquid product, the separated catalyst being reused in the formation of the slurry feed.

At the end of the first day of operation, the liquid product contains approximately 75% by volume of components boiling below 900° F. and has a gravity of 28.5° API and a sulfur content of 0.8%, indicating an excellent improvement in the treated oil. At the end of twenty days of continuous operation, the liquid product contains about 70% by volume of components boiling below 900° F. and has a gravity of 26.3° API and a sulfur content of 1.1%, indicating only a moderate decrease in the activity of the catalyst.

*Example 2*

The experiment of Example 1 is repeated using the same charge stock catalyst and reaction conditions except that no clay pellets are present in the reactor. Instead, the reactor is fitted with a plurality of baffles arranged to minimize the formation of large gas bubbles in the slurry within the reactor.

At the end of the first day of operation, the liquid product contains 57% by volume of components boiling below 900° F. and has a gravity of 25.1° API and a sulfur content of 1.5% by weight. Since very little inactivation of the catalyst can be assumed to occur in the first day of operation, the superiority of the results in this amount of time with the operation of Example 1 can be attributed to better contact among the reactants and the catalyst when a pass of ebullated solids is used.

At the end of ten days of continuous operation, the liquid product contains only 46% by volume of components boiling below 900° F. and has a gravity of 20.4° API and a sulfur content of 3.7% by weight, indicating a substantial decrease in the activity of the catalyst. This relatively rapid decline of the activity of the catalyst when compared with the results of Example 1 can be attributed to the lack of the ebullated mass of clay pellets in the reactor.

While certain liquid flow rates and sizes of ebullated solid particles have been set forth for most practical operations under this invention, deviations from these flow rates and particle sizes are possible depending upon the several variables hereinbefore mentioned of each contacting operation. For instance, petroleum coke particles of 42 to 60 mesh size are ebullated by a catalyst-oil slurry flowing upwardly at the rate of 10 gallons per minute per square foot of horizontal cross-section of the reaction zone. On the other hand, glass pellets in the form of one-half inch diameter spheres are ebullated by the same slurry flowing at the rate of 150 gallons per minute per square foot.

Many modifications of the invention will occur to those skilled in the art upon consideration of this disclosure without departing from the spirit or scope thereof. For instance, protective screen 13 in reactor 9 of the drawing may be omitted and its function may be duplicated by enlarging the horizontal cross-section of the top portion of reactor 9 beginning at a level in the vicinity of the upper level of ebullation 12. Thus, the slurry flow rate up through the top portion of reactor 9 will be appreciably decreased with the result that entrained particles from the ebullated mass will tend to drop back thereto. The slurry passing through reactor 9 does not have to be withdrawn through top outlet 14. Instead, the slurry may be discharged through a lateral outlet in reactor 9 disposed at a level above the upper level of ebullation 12 while a gasiform effluent is separately withdrawn through top outlet 14. In other words, the separation of the admixed slurry and gasiform streams may be carried out in the top portion of reactor 9 rather than in separator 16 shown in the drawing. Accordingly, only such limitations should be imposed on the invention as are set forth in the appended claims.

I claim:
1. In a catalytic chemical reaction involving a three component system of a liquid, a gasiform material and a mass of particulate solids wherein the particulate solids are between about 3 and 20 mesh (Tyler) and are normally maintained within a contact zone, and wherein the contact zone is under elevated temperature and pressure conditions required for the specified reaction, the improvement which comprises passing the liquid and the gasiform material together with active catalyst capable of being carried in suspension by the liquid and of passing through the mass of particulate solids in such suspension upwardly through the mass of particulate solids, maintaining the linear velocity of the liquid and catalyst through the mass of particulate solids in the range of 10 to 150 gallons per minute per square foot of horizontal cross section of the contact zone, and, based on the particulate solid size and density and liquid density, such as to maintain the mass of particulate solids in an expanded state of at least 10% greater volume than the settled state of the mass of particulate solids but below a rate to carry over particulate solids from the zone, the liquid rate being sufficient to carry the catalyst through the particulate solids and out of the reaction zone, maintaining a linear gas rate for the size and density of the solids sufficient to aid in producing a random motion of the solids in the liquid but, by itself, insufficient to cause fluidization of the solids, maintaining in said contact zone an upper level of liquid above which no particulate solids are carried, recycling a major portion of the reacted liquid component and active catalyst, removing a reacted liquid component and active catalyst from the contact zone and separating the liquid component from the catalyst.

2. The process of hydrogenating a petroleum oil composed of at least 10% of a fraction boiling above 900° F. and having a sulfur content of at least 1.0% which comprises flowing said oil in liquid phase with a hydrogen rich gas upwardly through a contact zone containing a bed of a particulate hydrogenation catalyst passing 80 mesh (Tyler) and at a hydrogen pressure and at a temperature and space velocity such that the percentage of desulfurization of the feed hydrocarbon is of the order of 80% and the conversion of the fraction boiling above 900° F. to a fraction boiling below 900° F. is of the order of 70%, maintaining a hydrogen rich gas velocity in the order of 6000 standard cubic feet of hydrogen per barrel of hydrocarbon charge, collecting a reaction effluent containing a substantial amount of liquid in the upper part of the contact zone, and recycling a portion of said reaction effluent to the lower part of the contact zone such that the upflow liquid velocity including the feed shall be maintained in the order of 60 gallons per minute per square foot of horizontal cross section of the zone to establish an expansion of volume of the bed based on the settled volume of the bed and accomplish random motion of the particles without carryover of all of the particles from the zone, withdrawing the net reaction effluent, and separating the liquid component from the catalyst.

3. The catalytic chemical reaction described in claim 1 and wherein the recycling of a major portion of the reactive fluid component and active catalyst takes place internally within the reactor.

4. In a catalytic chemical reaction involving a three component system of a liquid, a gasiform material and a mass of particulate solids wherein the particulate solids are between about 3 and 20 mesh (Tyler) and are normally maintained within a contact zone, and wherein the contact zone is under elevated temperature and pressure conditions required for the specified reaction, the improvement which comprises passing the liquid and the gasiform material together with active catalyst capable of being carried in suspension by the liquid and of passing through the mass of particulate solids in such suspension upwardly through the mass of particulate solids, maintaining the linear velocity of the liquid and catalyst through the mass of particulate solids in the range of 10 to 150 gallons per minute per square foot of horizontal cross section of the contact zone, and, based on the particulate solid size and density and liquid density, such as to maintain the mass of particulate solids in an expanded state of at least 10% greater volume than the settled state of the mass of particulate solids but below a rate to carryover particulate solids from the zone, the liquid rate being sufficient to carry the catalyst through the particulate solids and out of the reaction zone, maintaining a linear gas rate for the size and density of the solids sufficient to aid in producing a random motion of the solids in the liquid but, by itself, insufficient to cause fluidization of the solids, maintaining in said contact zone an upper level of liquid above which no particulate solids are carried, removing a reacted liquid component and active catalyst from the contact zone and separating the liquid component from the catalyst.

5. The process of claim 4 wherein the liquid is a heavy hydrocarbon residual oil composed primarily of components boiling above 900° F., and having a sulfur content of at least 1% by weight, the gasiform material is hydrogen, the reaction zone is maintained at superatmospheric temperatures and pressure whereby desulfurization occurs.

6. The process of claim 5 wherein the catalyst is of a size to substantially all pass an 80 mesh screen and is slurried in oil to about 20% of the weight of the oil, and the slurry is recycled at a rate of above 10 times the fresh feed of slurry through the bed of solid particles of contact material.

References Cited in the file of this patent

UNITED STATES PATENTS

| | | |
|---|---|---|
| 2,486,243 | Atwell | Oct. 25, 1948 |
| 2,962,434 | Pohlenz | Nov. 29, 1960 |
| 2,987,465 | Johanson | June 6, 1961 |